United States Patent
Yaung et al.

(10) Patent No.: US 9,641,675 B2
(45) Date of Patent: *May 2, 2017

(54) DIGITAL SIGNATURE-OVER-VOICE FOR CALLER ID VERIFICATION

(71) Applicant: International Business Machines Corporation, Armonk, NY (US)

(72) Inventors: Alan T. Yaung, San Jose, CA (US); Ang Yi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,949

(22) Filed: Nov. 30, 2016

(65) Prior Publication Data
US 2017/0078482 A1    Mar. 16, 2017

Related U.S. Application Data

(63) Continuation of application No. 15/012,884, filed on Feb. 2, 2016, which is a continuation of application No. 14/816,147, filed on Aug. 3, 2015.

(51) Int. Cl.
*H04M 3/22* (2006.01)
*H04L 9/32* (2006.01)
(Continued)

(52) U.S. Cl.
CPC ....... *H04M 3/42068* (2013.01); *H04M 1/665* (2013.01)

(58) Field of Classification Search
CPC ............ H04M 3/2281; H04M 3/42076; H04L 9/3247; H04L 63/083; H04W 12/06; H04W 12/04
(Continued)

(56) References Cited

U.S. PATENT DOCUMENTS 6,324,271 B1 * 11/2001 Sawyer ............... H04M 1/57
379/142.04
6,418,472 B1 * 7/2002 Mi ....................... G06F 21/6218
709/202
(Continued)

OTHER PUBLICATIONS

IBM et al., "Method to Filter Out Telemarketers from Land Lines and Cell Phones", an IP.com Prior Art Database Technical Disclosure, Original Publication Date, Dec. 13, 2004, IP.com No. 000033514, pp. 1-2, Dec. 13, 2004.
(Continued)

*Primary Examiner* — Sharad Rampuria
(74) *Attorney, Agent, or Firm* — Gilbert Harmon, Jr.

(57) ABSTRACT

In an approach to caller ID verification by digital signature, a computing device receives authenticating information associated with a caller. The computing device creates a call record based on the authenticating information. The computing device retrieves additional information associated with the caller. The computing device updates the call record based on the additional information. The computing device retrieves a digital signature associated with the caller. The computing device retrieves public key information associated with the caller. The computing device performs a digital signature assessment based on the public key information. The computing device updates the call record based on the digital signature assessment. The computing device adds timestamp information to the call record. The computing device receives a request from a call recipient device. The computing device communicates information based on the call record to the call recipient device. The computing device marks the call record as expired.

1 Claim, 5 Drawing Sheets

(51) Int. Cl.
*H04W 12/04* (2009.01)
*H04M 3/42* (2006.01)
*H04M 1/665* (2006.01)

(58) Field of Classification Search
USPC .................................................. 455/410–411
See application file for complete search history.

(56) References Cited

U.S. PATENT DOCUMENTS

| | | | |
|---|---|---|---|
| 6,523,067 B2 | 2/2003 | Mi et al. | |
| 6,918,035 B1* | 7/2005 | Patel | H04L 63/061 380/247 |
| 7,756,748 B2 | 7/2010 | Shaked et al. | |
| 8,467,512 B2 | 6/2013 | Amir et al. | |
| 8,965,342 B1* | 2/2015 | Efrati | H04W 12/06 380/247 |
| 9,060,057 B1* | 6/2015 | Danis | H04M 3/42059 |
| 2003/0131115 A1 | 7/2003 | Mi et al. | |
| 2003/0135562 A1* | 7/2003 | Himmel | G06Q 10/10 709/206 |
| 2006/0206709 A1* | 9/2006 | Labrou | G06Q 20/18 713/167 |
| 2011/0264913 A1 | 10/2011 | Nikander et al. | |
| 2013/0282920 A1 | 10/2013 | Zhang et al. | |
| 2014/0074604 A1 | 3/2014 | Castillo et al. | |
| 2014/0082366 A1* | 3/2014 | Engler | H04L 9/3226 713/176 |
| 2014/0136194 A1 | 5/2014 | Warford et al. | |
| 2014/0155030 A1* | 6/2014 | Malik | H04N 21/26613 455/411 |
| 2015/0282216 A1 | 10/2015 | Reshef et al. | |
| 2016/0014151 A1* | 1/2016 | Prakash | H04L 63/1483 726/22 |
| 2016/0014605 A1 | 1/2016 | Robinton et al. | |
| 2016/0219034 A1 | 7/2016 | Hintemeister et al. | |

OTHER PUBLICATIONS

Internet Society Request for Comment (RFCs), Secure Telephone Identity Problem Statement and Requirements (RFC7340), an IP.com Prior Art Database Technical Disclosure, Original Publication Date: Sep. 1, 2014, IP.com No. 000238894, pp. 1-50.

Choros Kazimierz, "Real Anomaly Detection in Telecommunication Multidimensional Data Using Data Mining Techniques", ICCCI 2010, Part I, LNAI 6421, pp. 11-19, 2010, © Springer-Verlag Berlin Heidelberg 2010.

Mustafa et al., "You Can Call But You Can't Hide: Detecting Caller ID Spoofing Attacks", 2014 44th Annual IEEE/IFIP International Conference on Dependable Systems and Networks, © 2014 IEEE, DOI 10.1109/DSN.2014.102, pp. 168-179.

Pan et al., "Computational Collective Intelligence", Springer, Second International Conference, ICCCI 2010, Kaohsiung, Taiwan, Nov. 10-12, 2010, Proceedings, Part I, pp. 1-5.

Yusoff et al., "Fraud Detection in Telecommunication Industry Using Gaussian Mixed Model", 3rd International Conference on Research and Innovation in Information Systems—2013 (ICRIIS'13), pp. 27-32, Nov. 27-28, 2013, Kuala Lumpur, IEEE.

"Telephonic Client Identification", Tools4ever.com, © Copyright 1999-2015, pp. 1-2, <https://www.tools4ever.com/about-tools4ever/news/Caller-ID/>.

"The Voice Signature Service", TradeHarbor, Copyright 2009-2010 by TradeHarbor, Inc., St.Louis, Missouri, pp. 1-5, <http://www.tradeharbor.com/vss.html>.

"Verify Caller ID", Pindrop Security Blog, posted Sep. 3, © 2010-2013 Pindrop Security, pp. 1-2, <http://www.pindropsecurity.com/secure-phone-transactions/>.

Yaung et al., "Digital Signature-Over-Voice for Caller ID Verification", U.S. Appl. No. 14/816,147, filed Aug. 3, 2015, 27 pages.

Yaung et al., "Digital Signature-Over-Voice for Caller ID Verification", U.S. Apl. No. 15/012,884, filed Feb. 2, 2016, 25 pages.

IBM Appendix P, list of patents or patent applications treated as related, Nov. 30, 2016, 2 pages.

\* cited by examiner

DIGITAL SIGNATURE-OVER-VOICE FOR CALLER ID VERIFICATION

TECHNICAL FIELD OF THE INVENTION

The present invention relates generally to the field of telecommunication fraud prevention, and more particularly to caller identification (caller ID) verification.

BACKGROUND OF THE INVENTION

In the past, when phone carriers were limited in number and easily identified, a call recipient could generally trust the information transmitted by caller ID services. Today, Voice over IP (VoIP) providers and fraudulent caller ID providers make it easier for callers, often criminally motivated, to provide falsifying information to the recipient in a spoofing attack. Additional measures that validate caller ID can help to protect the call recipient from misplacing his or her trust in an unauthorized party.

SUMMARY

According to one embodiment of the present invention, a computer program product for verifying an identity of a caller, the computer program product comprising: one or more computer readable storage media and program instructions stored on the one or more computer readable storage media, the program instructions comprising: program instructions to receive authenticating information associated with a caller, wherein the authenticating information comprises a password, caller ID information, a caller phone number, a recipient phone number, and a URL; program instructions to create a call record based on the authenticating information; program instructions to retrieve additional information associated with the caller; program instructions to update the call record based on the additional information associated with the caller; program instructions to retrieve based on interfacing with the URL, a digital signature associated with the caller; program instructions to retrieve public key information associated with the caller; program instructions to perform a digital signature assessment based on the public key information, wherein the digital signature assessment comprises a determination that the digital signature is valid, not valid, or unverifiable; program instructions to update the call record based on the digital signature assessment; program instructions to add timestamp information to the call record; program instructions to receive a request from a call recipient device; program instructions to communicate information based on the call record to the call recipient device; and program instructions to mark, after a predefined length of time from the addition of the timestamp, the call record as expired.

DETAILED DESCRIPTION

The present invention is an approach to caller authentication that validates a caller ID, supplementing it with verification of a separate digital signature to determine whether the received caller ID information is accurate. Other approaches to caller ID validation work by building trusted covert channels between end users, which allow a call recipient device to request validation from the purported caller device; by using voice recognition to verify caller identity; or by requiring that the caller answer security questions at the beginning of a call. Some of these approaches specifically contemplate an organization as the call recipient and an individual as the caller. Embodiments of the present invention can provide assistance to various types of call recipients, not limited to organizations receiving calls from unknown individuals, by obtaining and communicating easy-to-comprehend information on whether or not the recipient's caller ID service is providing accurate information.

Figure 1A:
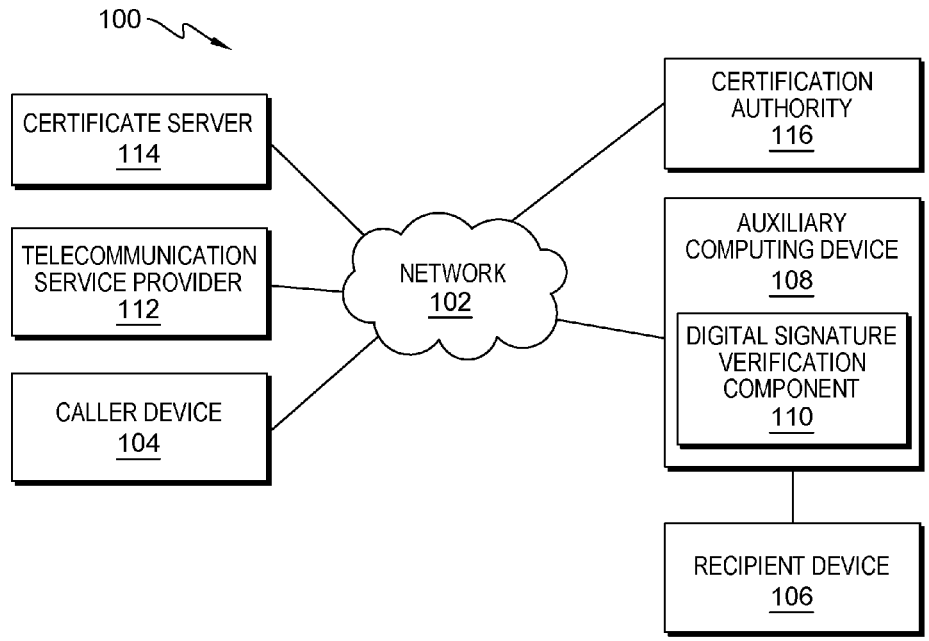
FIG. 1A-C are diagrams of a first, second, and third network environment, respectively, in accordance with embodiments of the present invention.

Embodiments of the present invention are described herein with reference to the Figures. FIG. 1A is a functional block diagram illustrating a first network environment 100 in accordance with one embodiment of the present invention. Network environment 100 includes network 102, caller device 104, recipient device 106, auxiliary computing device 108, digital signature verification component 110, telecommunication service provider 112, certificate server 114, and Certification Authority 116.

Caller device 104 and recipient device 106 are interconnected over network 102. Network 102 can be, for example, a telecommunications network, a local area network (LAN), a wide area network (WAN), such as the Internet, or a combination of more than one of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that support communications between caller device 104, recipient device 106, and other devices (not shown) within an environment such as network environment 100.

Caller device 104 can be interconnected over network 102 with systems of telecommunication service provider 112. Telecommunication service provider 112 can be an incumbent local exchange carrier, a competitive local exchange carrier (CLEC), a mobile wireless communication company, or any communications service provider responsible for the acceptance and transmission of communications such as those between caller device 104, recipient device 106, and other devices (not shown) interconnected over network 102.

Caller device 104 can be a fixed line telephone, a mobile phone, or any device capable of communicating with recipient device 106 and other devices (not shown) over network 102.

Recipient device 106 can be a fixed line telephone such as a hard-wired or cordless telephone, or any device capable of connecting to network 102 by a telephone line. Recipient device 106 is communicatively interconnected with auxiliary computing device 108.

Auxiliary computing device 108 can be any programmable electronic device capable of executing machine-readable instructions and communicating with various components and devices within network environment 100. Auxiliary computing device 108 includes digital signature verification component 110, which performs steps of a client device-based digital signature verification method as described herein with reference to FIG. 2. Auxiliary computing device 108 can include internal and external hardware components, as depicted and described in further detail with respect to FIG. 4.

Certificate server 114 can be a server system that is capable of providing a digital signature on behalf of caller device 104 to auxiliary computing device 108 and other devices (not shown) within network environment 100. Certificate server 114 can be interconnected with auxiliary computing device 108, Certification Authority 116, and other devices (not shown) over network 102.

Certification Authority 116 can be a trusted third party system capable of issuing digital certificates, also known as public key certificates, that can be used to verify a digital signature provided on behalf of caller device 104 to auxiliary computing device 108 and other devices (not shown) within network environment 100. Certification Authority 116 can be interconnected with auxiliary computing device 108, certificate server 114, and other devices (not shown) over network 102.

Figure 1B:
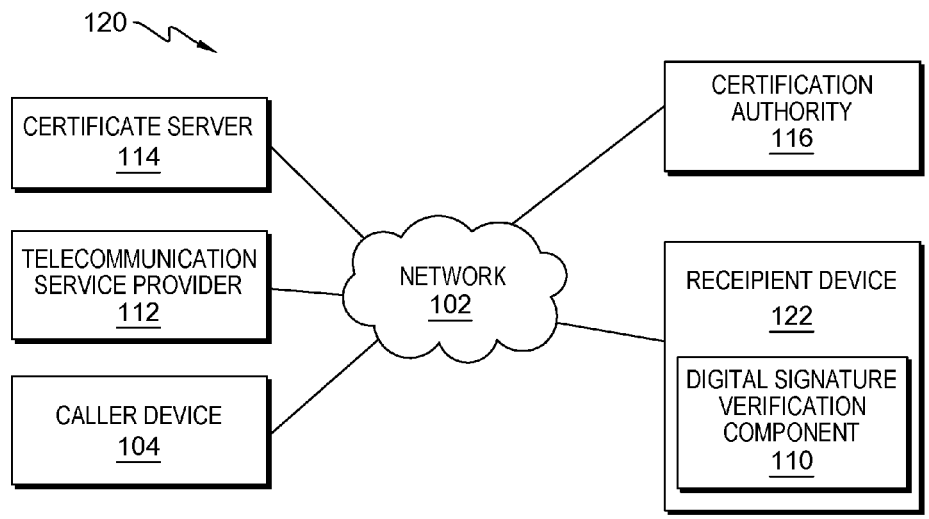

FIG. 1B is a functional block diagram illustrating a second network environment 120 in accordance with another embodiment of the present invention. FIG. 1B includes network 102, caller device 104, recipient device 122, digital signature verification component 110, telecommunication service provider 112, certificate server 114, and Certification Authority 116.

Caller device 104 and recipient device 122 are interconnected over network 102. Recipient device 122 can be a mobile phone such as a smartphone, or any device capable of connecting wirelessly to network 102, and capable of executing machine-readable instructions and communicating with various components and devices within network environment 120. Recipient device 122 includes digital signature verification component 110, which performs steps of a client device-based digital signature verification method as described herein with reference to FIG. 2. Recipient device 122 can include internal and external hardware components, as depicted and described in further detail with respect to FIG. 4.

Figure 1C:
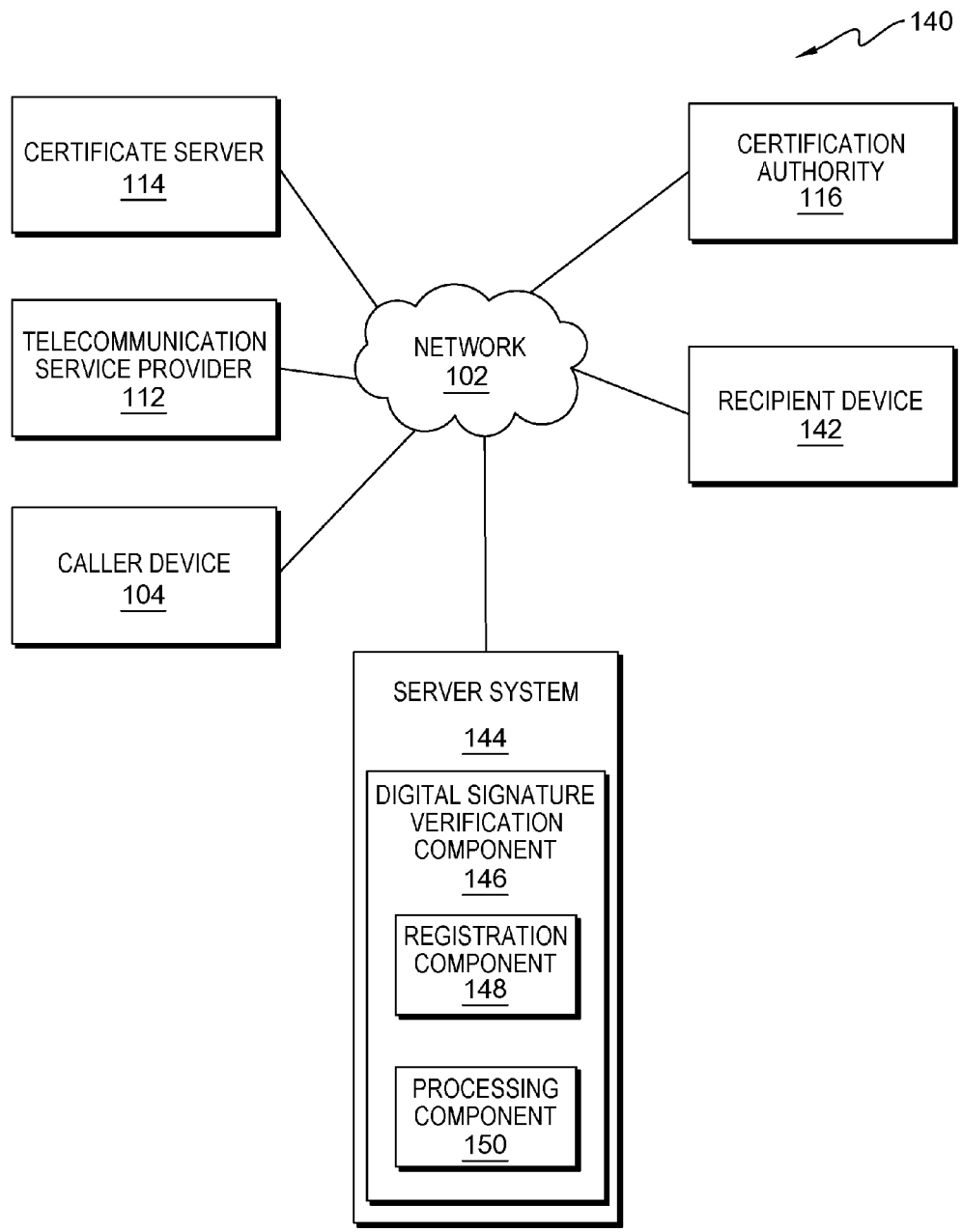

FIG. 1C is a functional block diagram illustrating a third network environment 140 in accordance with another embodiment of the present invention. Network environment 140 includes network 102, caller device 104, recipient device 142, server system 144, digital signature verification component 146, registration component 148, processing component 150, telecommunication service provider 112, certificate server 114, and Certification Authority 116.

Caller device 104 and recipient device 142 are interconnected over network 102. Recipient device 142 can be a fixed line telephone, a mobile phone, or any device capable of communicating with caller device 104 over network 102 and capable of, independently or in communicative connection with a computing component such as but not limited to an auxiliary computing device, executing machine-readable instructions and communicating with various components and devices within network environment 140.

Server system 144 can be a server system capable of communicating with caller device 104, recipient device 142, certificate server 114, Certification Authority 116, and other devices (not shown) across network 102, and capable of executing machine-readable instructions. Server system 144 includes digital signature verification component 146, which includes registration component 148 and processing component 150, and performs steps of a server-based digital signature verification method as described herein with reference to FIG. 3. Server system 144 can include internal and external hardware components, as depicted and described in further detail with respect to FIG. 4.

Figure 2:
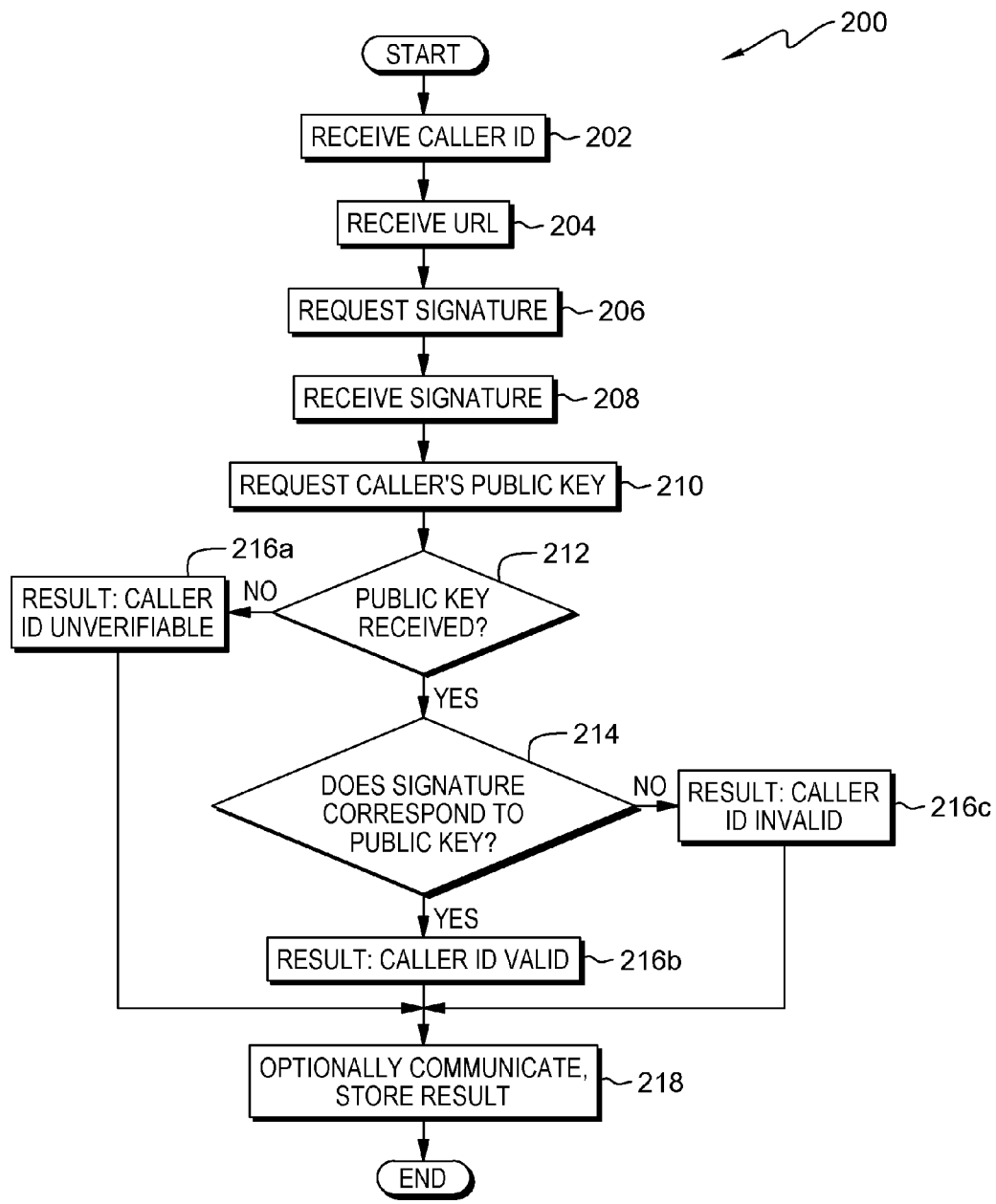
FIG. 2 is a flowchart depicting operational steps of a client device-based digital signature verification method, in accordance with an embodiment of the present invention.

FIG. 2 is a flowchart 200 depicting operational steps of a client device-based digital signature verification method performed by digital signature verification component 110 of network environment 100, in accordance with an embodiment of the present invention. It should be noted that the steps recited herein with reference to digital signature component 110 of network environment 100 are analogous to the steps performed by digital signature verification component 110 in network environment 120. Accordingly, auxiliary computing device 108 and recipient device 122 have analogous functions in their respective environments.

In step 202, digital signature verification component 110 receives caller ID information associated with a call. In step 204, digital signature verification component 110 receives a URL associated with the call that points to certificate server 114 via network 102. The URL can be, but need not be, provided as a toll service by telecommunication service provider 112. The URL employed can be, but need not be, a TinyURL, a shortened version of a longer URL, in order to reduce the amount of data transmitted and thus increase the speed of digital signal verification.

In step 206, digital signature verification component 110 requests the caller's digital signature from certificate server 114. In step 208, digital signature verification component 110 receives the caller's digital signature from certificate server 114. In another embodiment, if the caller has chosen to store a digital signature on caller device 104, obviating the need for a separate certificate server, digital signature verification component 110 can request the caller's digital signature from caller device 104 in step 206 and receive the caller's digital signature from caller device 104 in step 208.

In step 210, digital signature verification component 110 requests the caller's public key from Certification Authority 116. If digital signature verification component 110 does not receive the caller's public key in step 212, digital signature verification component 110 bypasses step 214 and determines that the caller ID is unverifiable in step 216a. If digital signature verification component 110 receives the caller's public key in step 212, digital signature verification component 110 determines whether the caller's digital signature corresponds to the public key in step 214. If the caller's digital signature corresponds to the public key in step 214, digital signature verification component 110 determines that the caller ID is valid in step 216b. If the caller's digital signature does not correspond to the public key in step 214, digital signature component 110 determines that the caller ID is invalid in step 216c.

In step 218, digital signature verification component 110 performs one or more actions based on the digital signature assessment. It should be noted that, although the one or more actions are collectively referred to as step 218 in the interest of simplicity, it is not implied that the actions should occur simultaneously. In step 218, digital signature verification component 110 can communicate a determination of validity, invalidity, or unverifiable nature of the caller ID to a user. For example, in some embodiments, digital signature verification component 110 can instruct auxiliary computing device 108 to communicate a visual message such as a pictorial icon (e.g., a check-mark signifying validity, an 'x' signifying invalidity) on a display. In some embodiments, digital signature verification component 110 can store information about a determination of validity, invalidity, or unverifiable nature in order to allow digital signature verification component 110 to recognize valid caller ID information in the future and bypass one or more of the steps of described with respect to FIG. 2.

Figure 3:
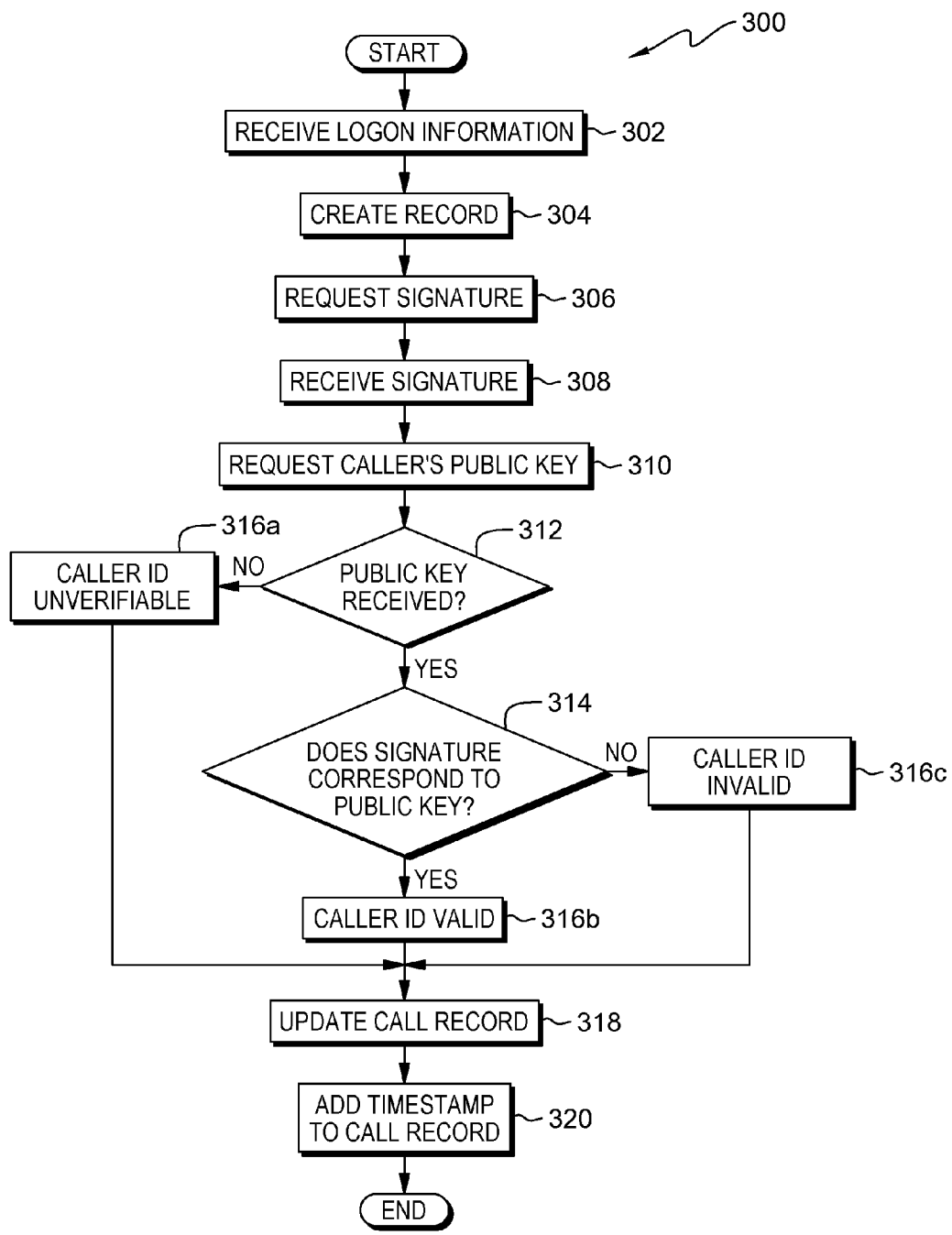
FIG. 3 is a flowchart depicting operational steps of a server-based digital signature verification method, in accordance with an embodiment of the present invention.

FIG. 3 is a flowchart depicting operational steps of a server-based digital signature verification method performed by digital signature verification component 146 in network environment 140, in accordance with an embodiment of the present invention. In step 302, digital signature verification component 146 receives logon information provided by caller device 104. For example, if caller device 104 is a mobile device with a keypad, digital signature verification component 146 can receive a username and password entered by a caller using the keypad of caller device 104.

In step 304, registration component 148 of digital signature verification component 146 creates a record to track the call. The record can include information such as, but not limited to, the caller's phone number; the call recipient's phone number; and information on the caller's business, if applicable (e.g., ratings, comments from customers).

In step 306, processing component 150 of digital signature verification component 146 requests the caller's digital signature from certificate server 114. In step 308, processing component 150 receives the caller's digital signature from certificate server 114. In another embodiment, if the caller has chosen to store a digital signature on caller device 104, obviating the need for a separate certificate server, digital signature verification component 146 can request the caller's digital signature from caller device 104 in step 306 and receive the caller's digital signature from caller device 104 in step 308.

In step 310, processing component 150 requests the caller's public key from Certification Authority 116. If processing component 150 does not receive the caller's public key in step 312, processing component 150 bypasses step 314 and determines that the caller ID is unverifiable in step 316a. If processing component 150 receives the caller's public key in step 312, processing component 150 determines whether the caller's digital signature corresponds to the public key in step 314. If the caller's digital signature corresponds to the public key in step 314, processing component 150 determines that the caller ID is valid in step 316b. If the caller's digital signature does not correspond to the public key in step 314, processing component 150 determines that the caller ID is invalid in step 316c.

In step 318, processing component 150 adds information regarding the digital signature assessment (e.g., the determination of validity, invalidity, or unverifiable nature of the digital signature) to the call record. In step 320, processing component 150 adds timestamp information to the call record. The timestamp can remain valid for a predefined period of time (e.g., 1-2 minutes), after which the record expires. While unexpired, the call record can be requested by recipient device 142.

Figure 4:
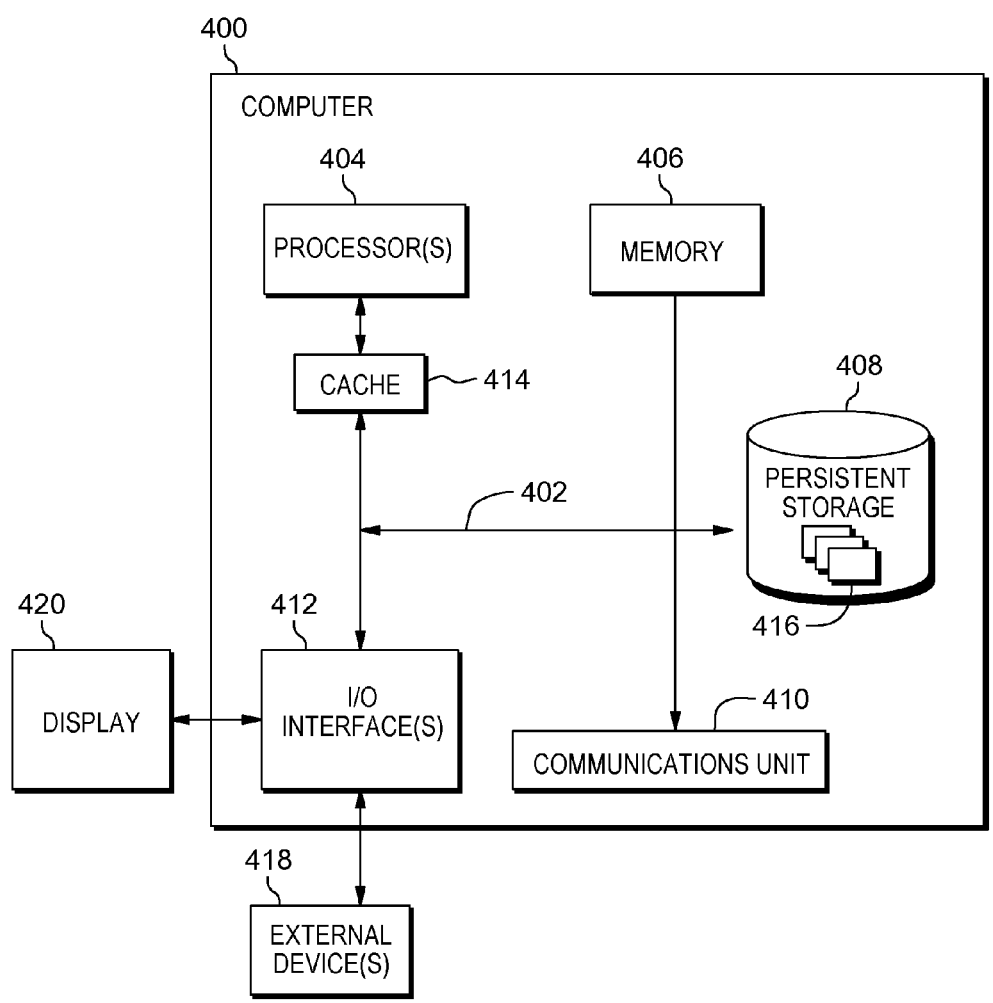
FIG. 4 is a block diagram of internal and external components of an auxiliary computing device, a mobile device, and a server device in the network environments of FIGS. 1A, 1B, and 1C, respectively, in accordance with embodiments of the present invention.

FIG. 4 depicts a block diagram of components of auxiliary computing device 108 in network environment 100, recipient device 122 in network environment 120, or server system 144 in network environment 140, in accordance with illustrative embodiments of the present invention. In the interest of simplicity, auxiliary computing device 108, recipient device 122, and server system 144 are collectively referred to herein as computing device 400. It should be appreciated that FIG. 4 is included for the purposes of illustration and does not imply any limitations with regard to the environments in which different embodiments may be implemented. Many modifications to the depicted environment can be made.

Computing device 400 includes communications fabric 402, which provides communications between computer processor(s) 404, memory 406, persistent storage 408, communications unit 410, input/output (I/O) interface(s) 412, and cache 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of computer processor(s) 404 by holding recently accessed data, and data near accessed data, from memory 406.

In the interest of simplicity, digital signature verification component 110 of network environment 100; digital signature verification component 110 of network environment 120; and digital signature verification component 146, registration component 148, and processing component 150 of network environment 140 are collectively referred to herein as component(s) 416. Component(s) 416 is stored in persistent storage 408 for execution by one or more of the respective computer processors 404 via one or more memories of memory 406. Persistent storage 408 can include a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. Communications unit 410 can include one or more network interface cards. Communications unit 410 can provide communications through the use of either or both physical and wireless communications links. Component(s) 416 can be downloaded to persistent storage 408 through communications unit 410.

I/O interface(s) 412 allows for input and output of data with other devices that can be connected to computing device 400. For example, I/O interface 412 can provide a connection to external devices 418 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., component(s) 416, can be stored on such portable computer readable storage media and can be loaded onto persistent storage 408 via I/O interface(s) 412. I/O interface(s) 412 can also connect to a display 420.

Display 420 provides a mechanism to display data to a user and can be, for example, a touch screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for verifying an identity of a caller, the computer program product comprising:
    one or more non-transitory computer readable storage media and program instructions stored on the one or more computer readable storage media, the program instructions comprising:
    program instructions to receive authenticating information associated with a caller, wherein the authenticating information comprises a password, caller ID (identification), a caller phone number, a recipient phone number, and a URL (uniform resource locator);
    wherein the URL information comprises a TinyURL;
    program instructions to create a call record based on the authenticating information;
    program instructions to retrieve additional information associated with the caller;
    program instructions to update the call record based on the additional information associated with the caller;
    program instructions to retrieve based on interfacing with the URL, a digital signature associated with the caller;
    program instructions to retrieve public key information associated with the caller;
    program instructions to perform a digital signature assessment based on the public key information, wherein the digital signature assessment comprises a determination that the digital signature is valid, not valid, or unverifiable;
    program instructions to update the call record based on the digital signature assessment;
    program instructions to add timestamp information to the call record; program instructions to receive a request from a call recipient device;
    program instructions to communicate information based on the call record to the call recipient device; and
    program instructions to mark, after a predefined length of time from the addition of the timestamp, the call record as expired.

* * * * *